M. D. BECKER.
PNEUMATIC CHUCK.
APPLICATION FILED FEB. 25, 1921.
1,430,050.
Patented Sept. 26, 1922.
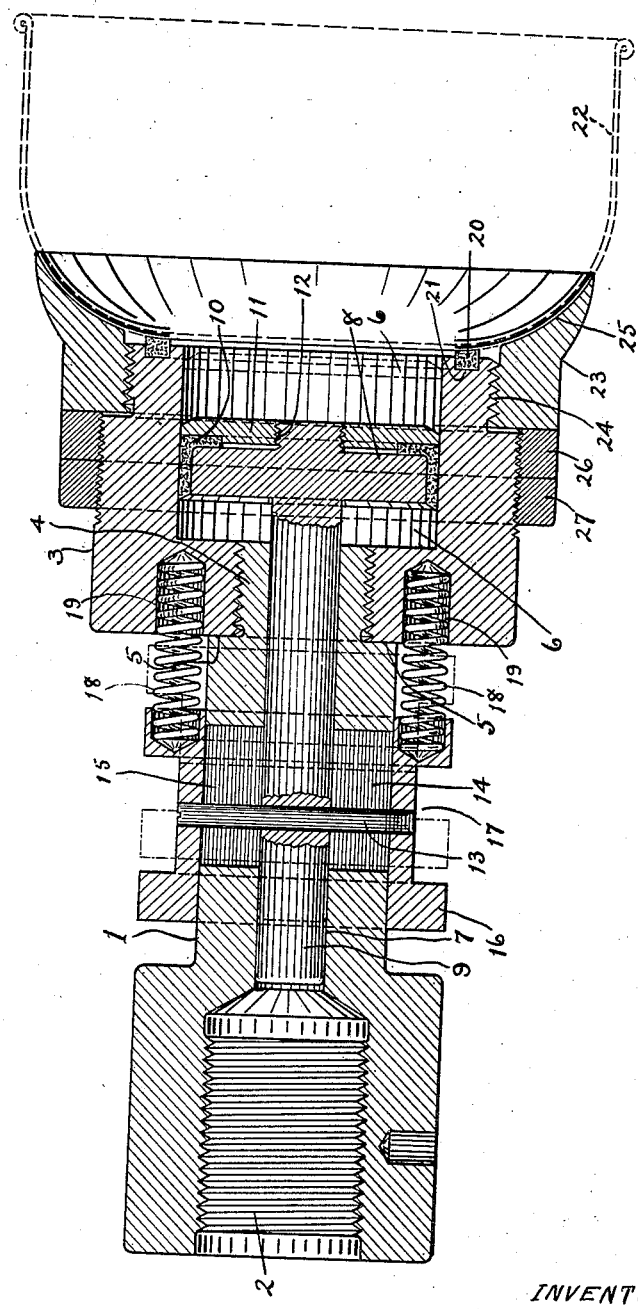
INVENTOR
Martin D. Becker
By Louis C. Vanderlip
his atty.

Patented Sept. 26, 1922.

1,430,050

UNITED STATES PATENT OFFICE.

MARTIN D. BECKER, OF ELKHART, INDIANA.

PNEUMATIC CHUCK.

Application filed February 25, 1921. Serial No. 447,849.

*To all whom it may concern:*

Be it known that I, MARTIN D. BECKER, a citizen of the United States, residing in the city of Elkhart, county of Elkhart, Indiana, have invented certain new and useful Improvements in Pneumatic Chucks, of which the following is a specificaton.

This invention relates to chucks, and more particularly to pneumatic chucks.

An object of my invention is to provide a pneumatic chuck to carry any metal cooking utensil, or the like, to enable the latter to be rapidly rotated for polishing or finishing it.

Another object of my invention is to provide a pneumatic chuck designed to be marketed as an article of manufacture and ready for introduction into any ordinary lathe. Other objects of my invention are mentioned and described herein.

The preferred embodiment of my invention is illustrated in the accompany drawing, in which the figure shown thereon is a longitudinal view in section through the chuck.

Similar numerals of reference indicate like parts throughout the figure on the drawing.

Referring to the drawing in detail, the numeral 1 indicates the chuck holder which may be cylindrically formed and provided at one end with the screw threaded socket 2 adapted to be engaged by a rotary portion or member—not shown—mounted in a lathe, or other machine, to effect rapid rotation of the chuck. The numeral 3 indicates a head member which may be screw threaded upon the reduced portion 4 of the holder 1 and which may engage the holder shoulder 5 when thus mounted. The head 3 is cylindrically bored at 6, which bore is open at the forward end of the head, the rear end of said bore being in communication with the bore 7 formed longitudinally in and of the holder 1 and which may be of lesser diameter than the bore 6.

A piston 8 is mounted for reciprocation within the head bore 6, said piston being provided with a piston rod 9 which is slidably arranged in the holder bore 7. The piston 8 may be provided with the leather cup packing 10 and a retaining cap 11, the latter of which may be screw threaded upon the piston reduced portion 12. The means for actuating the piston 8 in a forward direction are provided and may comprise a pin 13 penetrating and rigidly connected with the piston rod 9 diametrically thereof, which pin passes through and is movable within the slots 14 and 15 formed radially in the holder 1 and extending from the bore 7 to the outer periphery of the holder. The slots 14 and 15 have sufficient length longitudinally of the holder 1 to enable substantial movement of the pin 13 therein. The outer ends of the pin 13 may be rigidly connected with an actuating collar 16 which may slidably encompass the holder 1. The collar 16 may have an endless circumferential groove 17 adapted to be engaged by any suitable shifting device—not shown—such as a manually actuated shifting lever, as is well known in the arts, to effect a movement of the collar toward the head 3. A plurality of compression springs 18, 18 seated in sockets 19, 19 in the head 3 and engaging in suitable sockets in the forward end of the collar 16, normally urge the collar away from said head, whereby the piston 8 is actuated therewith.

Numeral 20 indicates an annular yieldable packing or sealing element, of leather or other suitable material, mounted in the annular groove 21 formed in the end face of the chuck head 3 and projecting somewhat therefrom to serve as a sealing seat for the base of the metal dish or utensil 22. The numeral 23 indicates a ring-like seat for the utensil 22, which seat element may be screw threaded upon the chuck head exterior at 24 to enable adjustment of the seat thereon, which seat member is provided with the semicupped interior 25 to enable the utensil 22 to be seated therein to prevent lateral displacement of said utensil.

A pair of locking rings or nuts 26 and 27 which are screw threaded upon the exterior of the head 3, serve to maintain the adjustment of the seat 23.

In operation, assuming that the chuck is mounted for rotation in a lathe, or any suitable machine, the operator actuates the piston 8 forward to a point adjacent the mouth of the bore 6, which position of the piston is maintained by the operator until the utensil 22 may be placed within the cupped ring seat 23 with the utensil base pressed against the sealing ring 20. Thereupon, the operator releases control of the collar 16 and the piston 8 is immediately partially retracted by the action of the springs 18, as described, thereby creating a partial vacuum between said piston and the base of the utensil 22, whereby the latter is held securely on the chuck head. Thereafter, the utensil is rapidly rotated by the chuck and suitable polishing or finishing thereof effected in any manner.

I claim:

1. A pneumatic chuck comprising a holder provided with a head for receiving the work, said head being provided with a vacuum chamber; a yieldable packing element mounted upon the end face of said chuck head; an adjustable seat element mounted upon said head and adjustable relatively to said packing element, said seat element being adapted to be engaged by the work when the latter is applied to the chuck; a piston movable in said head chamber; means for actuating said piston prior to the application of the work to the chuck; and means for retracting the piston to create a vacuum in said head chamber to hold the work on the chuck.

2. A pneumatic chuck comprising a holder provided with a head for receiving the work, said head being provided with a vacuum chamber; a yieldable packing element mounted upon the end face of said chuck head; an adjustable seat element mounted upon said head and adjustable relatively to said packing element, said seat element being adapted to be engaged by the work when the latter is applied to the chuck; means for maintaining the adjustment of said seat element; a piston movable in said head chamber; means for actuating said piston prior to the application of the work to the chuck; and means for retracting said piston to create a vacuum in said head chamber to hold the work on the chuck.

3. A pneumatic chuck comprising a holder provided with a head for receiving the work, said head having a vacuum chamber; packing means carried by said head and adapted to be engaged by the work; a seat on said head and adapted to be engaged by the work when the latter is applied to the chuck; a piston movable in said head chamber; and means for actuating said piston in one direction, said means comprising a piston rod, a collar slidable upon the exterior of said holder, a slot in said holder, and a pin rigidly connecting the piston rod with said collar through said slot.

4. A pneumatic chuck comprising, in combination, a holder provided with a head for receiving the work, said head being provided with a vacuum chamber; packing means encompassing the end of said vacuum chamber upon the end face of said chuck head; a piston movable in said head chamber; an adjustable seat element carried by said chuck head and adjustable relatively to said packing element; means for actuating the piston in said chamber prior to the application of the work to the chuck; spring pressed means for actuating said piston for effecting a vacuum in said chamber to hold the work on the chuck and in engagement with said packing means; and screw thread means for mounting the chuck upon a rotary element.

In testimony whereof I have hereunto affixed my signature this 19th day of February, 1921.

MARTIN D. BECKER.